United States Patent [19]

Atherton

[11] 4,134,710
[45] Jan. 16, 1979

[54] SIMULTANEOUS PLURAL-DIRECTIONAL FLOW MOTOR

[76] Inventor: DeWitt T. Atherton, 407 W. E St., Encinitas, Calif. 92024

[21] Appl. No.: 781,840

[22] Filed: Mar. 28, 1977

[51] Int. Cl.$^2$ ............................................. F03D 3/02
[52] U.S. Cl. ................................... 416/117; 290/53; 290/55
[58] Field of Search ........................ 415/2–4; 416/117, 118; 417/330; 290/42, 43, 44, 54, 53, 55

[56] References Cited

U.S. PATENT DOCUMENTS

| | | | |
|---|---|---|---|
| 1,015,517 | 1/1912 | Snyder | 416/119 |
| 1,234,405 | 7/1917 | Solomon | 415/3 |
| 1,315,692 | 9/1919 | Weed | 416/119 |
| 1,439,316 | 12/1922 | McArdle | 415/2 |
| 1,562,486 | 11/1925 | Alexander et al. | 416/117 |
| 1,811,565 | 6/1931 | Schwabacher | 415/4 |
| 3,920,354 | 11/1975 | Decker | 416/117 |
| 4,023,041 | 5/1977 | Chappell | 290/42 |
| 4,047,833 | 9/1977 | Decker | 415/2 |

FOREIGN PATENT DOCUMENTS 97811 9/1924 Fed. Rep. of Germany ............. 415/2

Primary Examiner—C. J. Husar
Attorney, Agent, or Firm—Knox & Knox

[57] ABSTRACT

A motor having an upright shaft with vanes driven by different, simultaneous, multidirectional, generally horizontal currents, for ocean offshore or beach installation, the vertical height, measured by the operative vertical span of the vanes, being significantly much greater than any known prior art wave operated motors and representing the novel concept of simultaneous driving of the motor by wave or inflow currents as well as undertow or outflow currents impinging simultaneously on separate, vertically spaced groups of vanes. The very considerable vertical height of the motor required in the practice of this invention reflects the necessity to accomodate to tidal variation and varying shoreward and backflow conditions, any undriven submerged portion tending to windmill harmlessly and any portion extending above the water, as at low tide, acting as a reasonably efficient wind motor complementing the water current-driven portions to increase the total power output which will ordinarily be electric power from overhead or base mounted generators driven from the shaft of the motor, and in the latter case the base is made accessible through a relatively large vertical fixed access shaft which may house the motor drive shaft. Horizontal plates between the tiers of vanes provide a bucketing function greatly increasing efficiency as well as providing structural rigidity.

7 Claims, 4 Drawing Figures

SIMULTANEOUS PLURAL-DIRECTIONAL FLOW MOTOR

BACKGROUND OF THE INVENTION

Attempts at meaningful harnessing of wave, tide and wind power have taken many forms including motors capable of being driven by currents of air or water from different directions, apparently always conceived as being unidirectional at any one time although shifting as conceived in the water wheel of Weeks, U.S. Pat. No. 376,357 and the motor of Olive, U.S. Pat. No. 1,157,416 as well as in Suter, U.S. Pat. No. 487,381 along with Beau, U.S. Pat. No. 401,761 and Bennett, U.S. Pat. No. 958,467. Wind power devices have included Werner, U.S. Pat. No. 653,047 and the more recent patent issued to Decker, U.S. Pat. No. 3,920,354 reported in the preliminary search of Patent Office records as the only recent patent disclosing relevant structure. It is known, however, that considerable interest is currently evident in this general field. It is also recognized that several of the above mentioned patents teach the use of flaps or vanes which open with the current in one direction and close against the current in the opposite direction to provide one-way drive, and that both horizontal and vertical axes have been proposed. There is a need however for a simple motor capable of economic construction and maintenance, which can be installed at the tide-water area or seashore, so as to be driven by both the wave-generated shoreward current of moving water as well as the backflow, with part time ancillary driving power derived from wind, and since constant adjustment to meet constantly varying conditions would be prohibitive in cost, there is a necessity for automatically self-adaptation to high and low tide conditions.

SUMMARY OF THE INVENTION

The invention as claimed herein is an adequate response to the immediately above-mentioned need, being a motor adapted to be combined with an electric generator, for installation in the tidewater region and having a base conceived as firmly embedded well below the low tide level, and a rotor extending vertically above the high tide level, with independently activated, one-way current-driven vanes. The vanes are mounted on and between a vertical series of plates and the plates and vanes together define a large plurality of buckets which capture the moving water with the same efficient bucketing action as the conventional water wheel, the portion of the rotor extending above the water under low tide conditions also serving as a complementary wind motor.

DETAILED DESCRIPTION OF A PREFERRED EMBODIMENT

Figure 1:
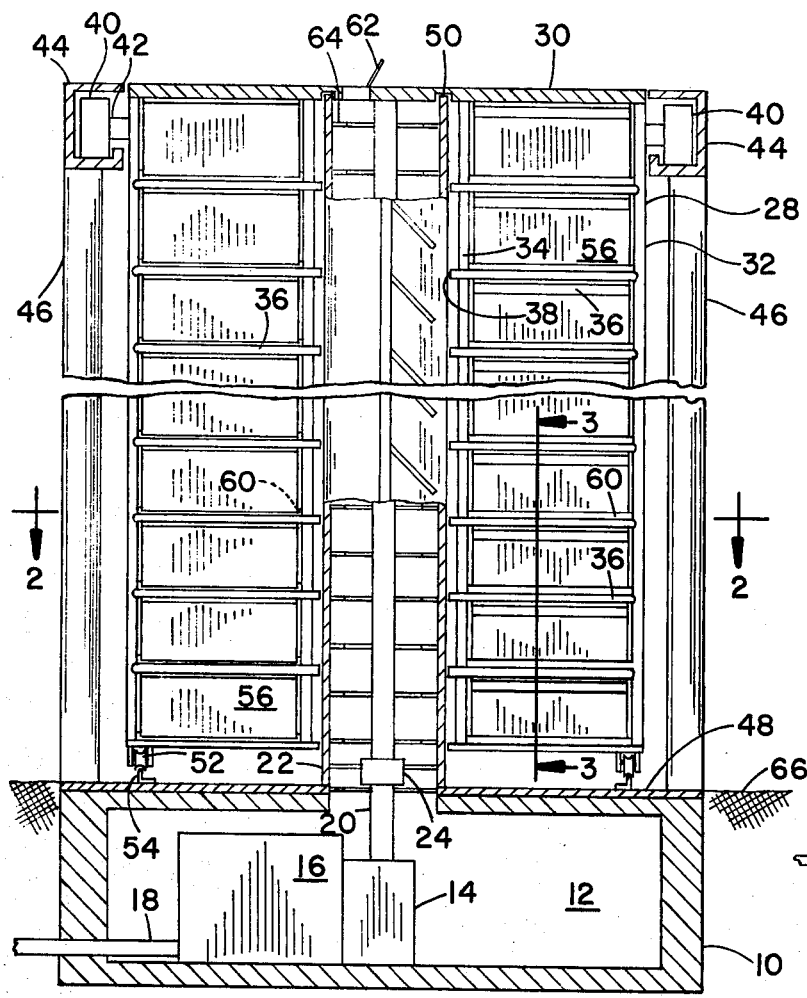
FIG. 1 is a side elevation view, partially cut away, of the invention.
Figure 3:
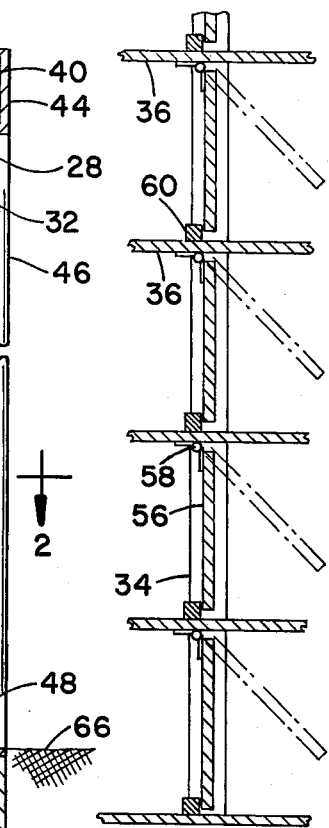
FIG. 3 is an enlarged fragmentary sectional view taken on line 3—3 of FIG. 1.

Referring now to the drawing, wherein like numerals refer to identical or similar parts throughout the different views, a preferred form of the invention comprises a base 10 which is conceived as being of sturdy metal and/or reinforced concrete construction and ordinarily embedded in the littoral material, often sand, sufficiently offshore to be well below low tide level. As illustrated in FIG. 1, the base 10 has a chamber 12 to house a gear box 14 and electric generator 16 with a power output cable 18, all diagrammatically represented, the generator of course being driven by the drive shaft 20 as hereinafter explained. The base 10 has an access shaft 22 which extends vertically to a height conceived as regularly well above the high tide level and the driveshaft 20 is similarly extended, being journalled at the bottom by bearing 24 which is supported within the access shaft 22 by a spider 26. The drive shaft is driven by the rotor generally indicated by the numeral 28.

Figure 2:
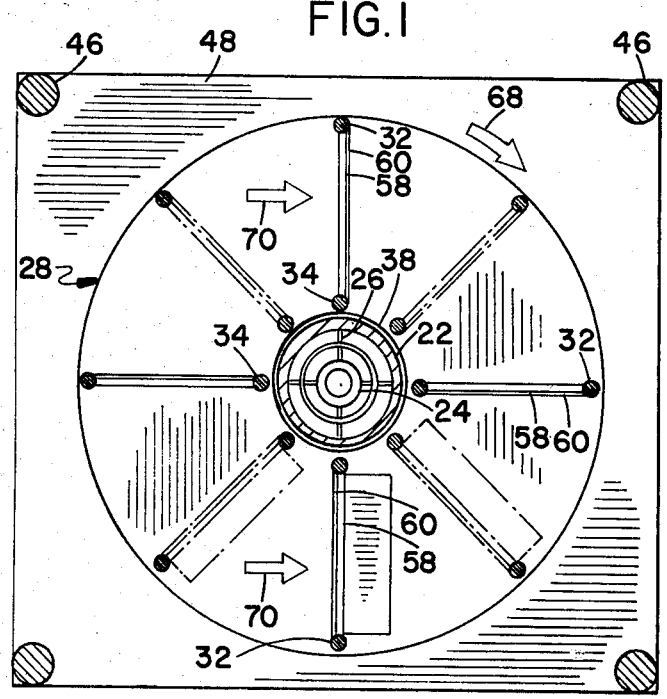
FIG. 2 is a sectional view taken on line 2—2 of FIG. 1.

The rotor 28 is of the upright type, coaxial with the drive shaft 20, and in preferred form the rotor has a sturdy top plate 30 rigidly mounted on the upper ends of two sets of rods identified as outer rods 32 and inner rods 34. These rods are arranged in radially aligned pairs as will be clear from an inspection of FIGS. 1 and 2, and may be thought of as primarily supported by the top plate 30. Vertically spaced ring plates 36, each centrally apertured as at 38 to accomodate the fixed access shaft 22, are secured adjacent their inner edges to said inner rods and secured adjacent their outer edges to said outer rods.

From the foregoing it will be evident that top plate 30, rods 32 and 34, and ring plates 36 together constitute a cage-like skeletal frame for the rotor 28 which frame is supported by rollers 40, mounted on stub axles 42 attached to the rods 32, and running in a sturdy horizontal circular channel member or race 44 rigidly mounted on the tops of vertical stanchions 46. The stanchions 46 preferably have the lower ends thereof secured to a base plate 48 which is in turn rigidly secured to the bottom of the access shaft 22. This construction enables the entire rotor assembly to be fabricated as a unit and facilitates the securement thereof on the base 10 after construction of the latter, by any suitable means such as lag bolts, not illustrated.

The rotor 28 may be further supported and stabilized by the upper end of the access shaft 22, as diagrammatically illustrated by said shaft 22 being let into the underside of the top plate 30 as at 50, and the rotor may be still further supported and stabilized by anti-frictional guidance means diagrammatically illustrated at 52 as small wheels operatively mounted on and between the lower end of the rotor and the base plate 48, the guidance function being indicated by the rail 54 on the base plate 48.

Each of the ring plates 36, except the lowermost thereof, has a plurality, four being illustrated, of vanes 56 hinged thereto as indicated at 58. These vanes 56 are of flap valve character being free to swing upwardly in one direction but prevented from swinging in the other direction by stops 60 fixed to the upper side of the plate beneath the corresponding vane. The vanes 56 and stops 60, of course, extend radially of the rotor 28 and the vanes are proportioned for substantial closure or blockage of the opening between the corresponding pair of ring plates 36 when the vanes are vertically disposed and held against movement relative to the plates by the stops 60, as illustrated in the right hand side of FIG. 1 and the upper side of FIG. 2. As a result, vertically disposed pairs of vanes and the adjacent plates, along with the adjacent wall portions of the access shaft 22, define buckets substantially closed top and bottom and on three sides, and open on the radially outward side. The top plate 30 may also be fitted with similar hinged vanes, as indicated in FIG. 1.

Access to the chamber 12 may be by way of a hatch plate 62 and opening in the top plate 30. Ring steps 64 on the inner surface of access shaft 22 lead down to chamber 12.

Figure 4:
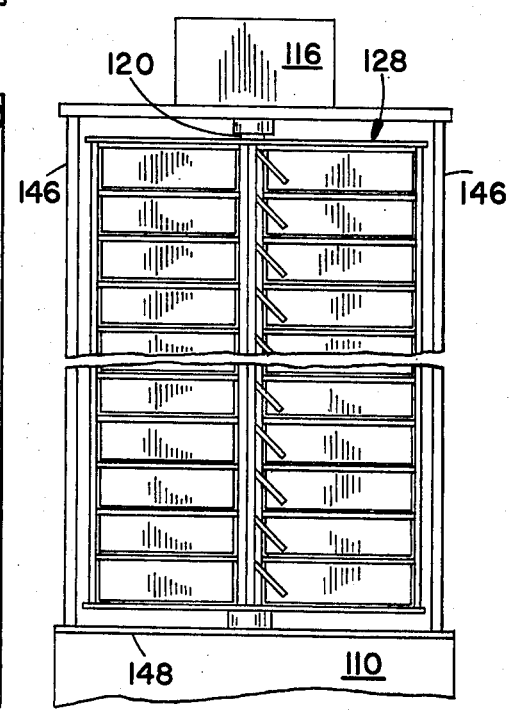
FIG. 4 is a side elevation view of a simplified form of the structure.

A simplified structure, embodying much of the general functionality of the above described structure is illustrated in FIG. 4. In this form a simple base 110 supports a base plate 148 with stanchions 146 and a fixed platform 144 on which is mounted a gear box-generator assembly 116 driven by drive shaft 120. The drive shaft in this configuration is driven by a rotor 128 similar to rotor 28 in general structure and in that the bucketing action is retained to a great extent but without the central closure effect of the access shaft 22.

The operation of this invention will be readily understood from a consideration of the foregoing, it being again stressed that this plural-directional flow motor is proposed as always being of considerable vertical height as well as having a large diameter rotor so that the rotor is simultaneously acted upon by both incoming or shoreward surface flow as well as subsurface backflow, and in some instances also acted upon by the wind. The necessary height has been explained in the earlier part of this specification, and in FIG. 1 the proposed embedding of the base 10 in the beach sand or other littoral is indicated at 66. The extent of such embedding, as indeed the proportions of the base 10, will be determined according to local conditions. The direction of rotation is of course always in the same direction as indicated by the arrow 68 in FIG. 2, but the flow such as indicated by the arrows 70 in any horizontal direction will act upon the vanes in one half of the rotor, at that level, and will simply deflect the vanes in the other half of the rotor, at that level, to the inoperative position indicated in the lower half of FIG. 2.

Having described my invention, what I claim as new is:

1. A tidewater motor driven by discrete simultaneous currents of water flowing in different directions at different levels and by wind above the water, said motor comprising:
   (a) a base providing fixed installation of the motor on a beach, beneath the low tide level;
   (b) a rotor assembly mounted on said base for rotation about a vertical axis, said rotor having a plurality of vertically spaced ring plates and independently activated one way current-driven vanes of flap-valve character mounted on and between said plates in a plurality of vertically spaced tiers extending from adjacent said base to above the high tide level, different tiers of vanes being simultaneously activated by shoreward currents of water generated by incoming waves and backflow currents of water and further activated by accompanying wind irrespective of the direction thereof.

2. Structure according to claim 1 wherein said vanes are hingedly attached to said plates, radially thereof, so that said vanes with adjacent portions of said plates define functional buckets.

3. Structure according to claim 1 including a skeletal frame fixedly mounted on said base externally of said rotor;
   said frame having a top ring plate; and
   said rotor being rotatively supported on said top ring plate.

4. Structure according to claim 1 wherein said base defines a watertight chamber with electric power generating means housed therein and operatively connected with said rotor.

5. Structure according to claim 4 including a fixed watertight access shaft mounted on said base and leading to said chamber.

6. Structure according to claim 5 wherein said access shaft is disposed substantially axially of said rotor and stabilizes said rotor.

7. Structure according to claim 6 wherein said access shaft substantially closes the radially inward ends of the functional buckets defined (claim 3) by said plates and vanes.

* * * * *